June 12, 1951  E. A. LOVE  2,556,814
CADDY CART
Filed Sept. 24, 1949  2 Sheets-Sheet 1
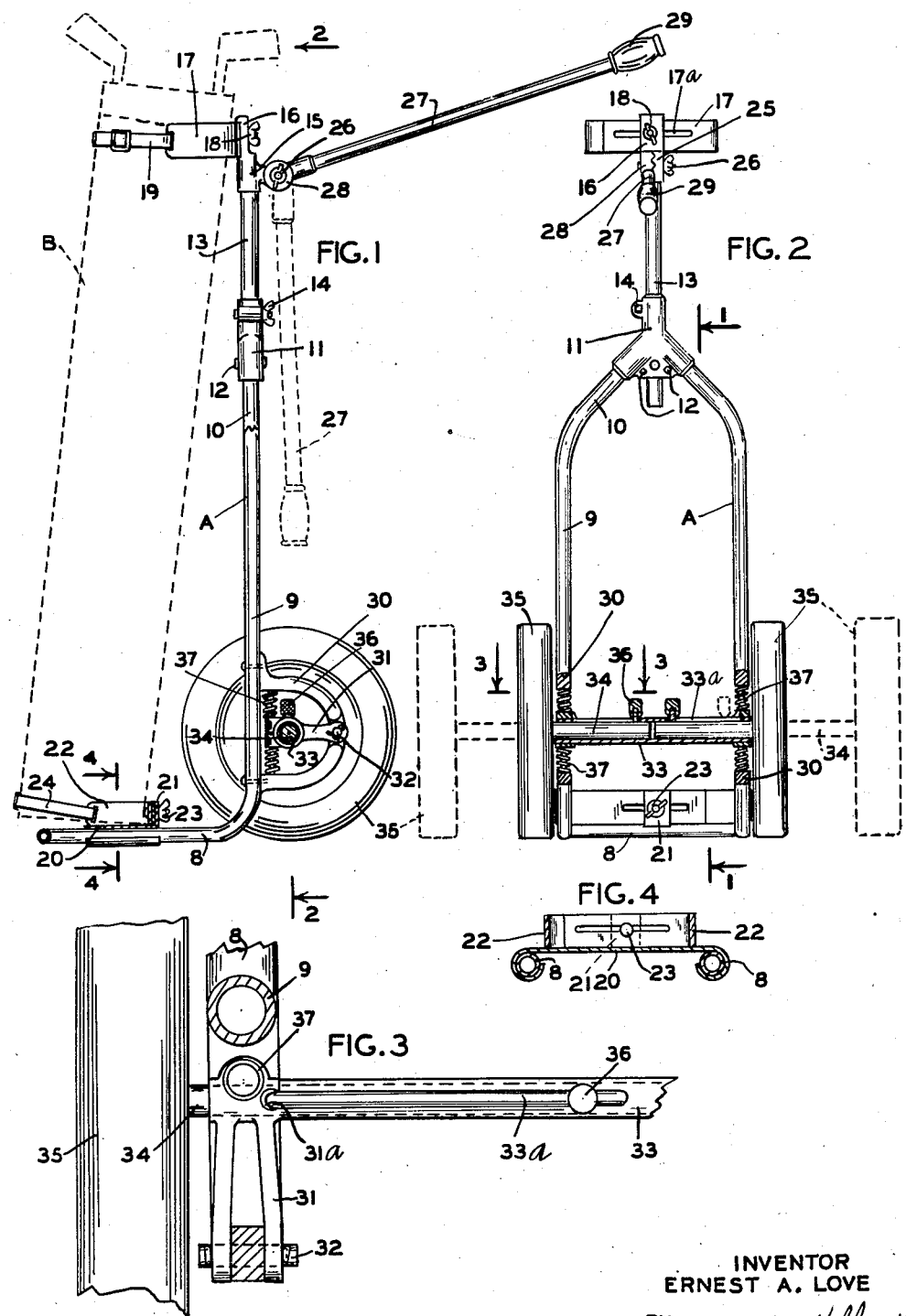
INVENTOR
ERNEST A. LOVE
BY Williamson & Williamson
ATTORNEYS June 12, 1951 E. A. LOVE 2,556,814
CADDY CART
Filed Sept. 24, 1949 2 Sheets-Sheet 2
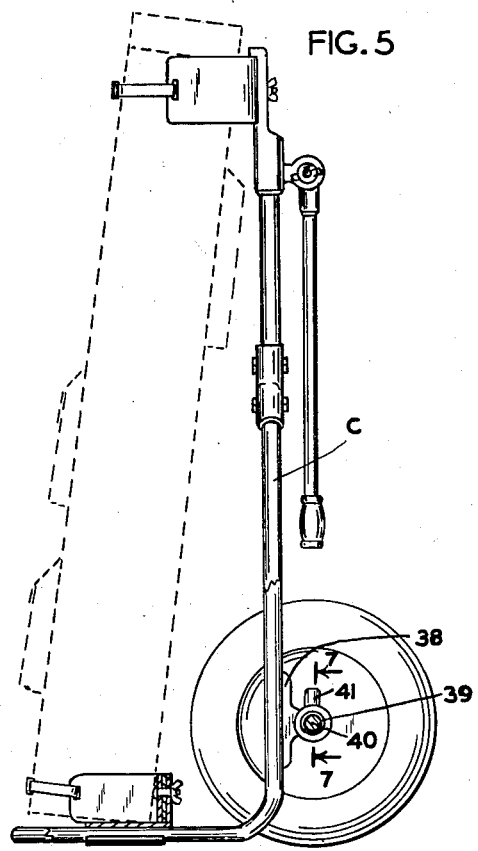
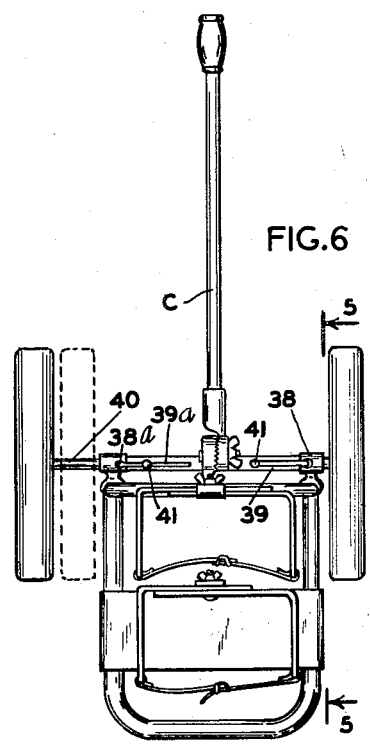
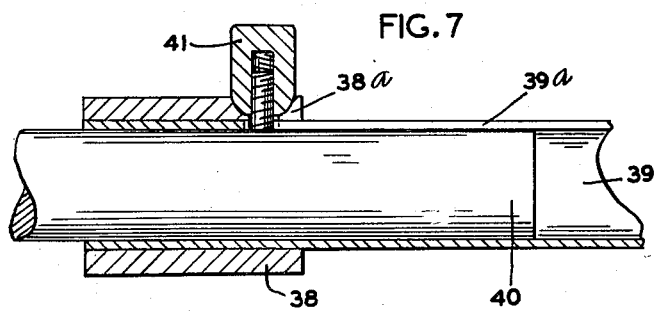
INVENTOR
ERNEST A. LOVE
BY
*Williamson & Williamson*
ATTORNEYS Patented June 12, 1951

2,556,814

UNITED STATES PATENT OFFICE 2,556,814

CADDY CART

Ernest A. Love, Minneapolis, Minn.

Application September 24, 1949, Serial No. 117,648

2 Claims. (Cl. 280—53)

This invention relates to caddy carts for use on golf courses.

It is one of the objects of the invention to provide a novel and improved caddy cart of lightweight, inexpensive construction which can be employed by a golfer to carry a golf bag with golf clubs therein around a golf course, the caddy cart being so constructed that it will stably support the golf bag when the device is in use and yet the caddy cart can be collapsed so that it can be placed within the usual athletic locker found in a golf clubhouse.

A more detailed object is to provide a caddy cart including an upright frame and wheel carrying axles for supporting the frame, the axles being so arranged that the wheels can be extended laterally from the frame to give the wheels wide gauge for stably supporting the cart when in use and yet the wheels may be collapsed against the frame so that the caddy cart may readily fit within a locker or other narrow space to be stored away in small compass when not in use.

A further object is to provide a caddy cart having novel means for adjustably supporting the bag so that the bag may be shifted relative to the wheel axles of the cart to meet the individual requirements of the golfer, depending on the weight of the bag and the weight of the clubs carried therein to stably support the bag in upright position when the cart is not being wheeled along the golf course and yet to approximately balance the weight of the cart, bag and clubs relative to the wheel axles when the cart is being wheeled over the course so as to impose very little weight on the golfer when the caddy cart is in use.

Another object is to provide a caddy cart wherein the frame of the cart is resiliently supported from the wheel axles so that vibrations and shocks imparted to the wheels as they travel over rough ground will not be imparted through the handle of the cart to the golfer.

Another object is to provide a caddy cart including bag holding means which are adjustable to receive and hold bags of different sizes and shapes.

The objects and advantages of the invention will more fully appear from the following description made in connection with the accompanying drawings wherein like reference characters refer to the same or similar parts throughout the several views, and in which Fig. 1 is a view in side elevation illustrating an embodiment of the invention, a portion of the lower extension of the frame and accompanying parts being shown in vertical section, a bag and golf clubs being shown in dotted lines, and the handle of the device being shown in full lines in one position and in dotted lines in a second position;

Fig. 2 is a view taken substantially on the line 2—2 of Fig. 1 as indicated by the arrows, the wheels being shown in full lines in retracted position and being shown extended in dotted lines;

Fig. 3 is a horizontal section taken substantially on the line 3—3 of Fig. 2 as indicated by the arrows;

Fig. 4 is a vertical section taken on the line 4—4 of Fig. 1 as indicated by the arrows;

Fig. 5 is a view similar to Fig. 1 of a slightly modified type of caddy cart;

Fig. 6 is a plan view of the caddy cart shown in Fig. 5 with one of the wheels being shown partly extended in full lines and being shown retracted in dotted lines; and Fig. 7 is a vertical section taken substantially on the line 7—7 of Fig. 5 as indicated by the arrows.

Referring first to the form of the caddy cart shown in Figs. 1–4, there is provided an upright frame designated as an entirety by the letter A which includes a tube having a lower U-shaped forward extension 8, upwardly extending side arms 9 and converging end portions 10 joining the said side arms. A three-way fitting 11 has a pair of diverging split sockets receiving the converging end portions 10 of the tube, the said split sockets being securely clamped to the said diverging end portions by screws 12 fitting through lugs in the said sockets. The fitting 11 has a third vertical split socket telescopically receiving an upper tube 13, the said socket receiving the tube 13 being adapted to be held in clamped relation to the tube by a screw 14. With this arrangement the upper tube 13 may be raised or lowered in the three-way fitting 11 to vary the height of the frame A.

The upper end of the tube 13 is capped by a casting 15 having an upwardly extending arm 16 which is rabbetted at its forward side, i. e., the left side as viewed in Fig. 1, to slidably receive a pair of angular bag receiving members 17 with opposed forwardly extending arms. The rear arms of the bag receiving members 17 overlap each other and are received within the rabbet of the arm 16, and the said two rear arms of the bag receiving members are provided with slots 17a through which a wing nut equipped bolt 18 carried by the arm 16 extends. With this arrangement the forwardly projecting arms of the two bag receiving members 17 may be spread apart varying distances to take the upper portion of a golf bag such as the bag B of any desired shape or size between them. The forward ends of the forwardly projecting arms of the bag receiving members 17 carry cooperating straps 19, one of which may be equipped with a buckle and the other of which may be equipped with openings to be received in the buckle whereby the upper portion of the bag B may be securely held. The forward U-shaped extension 8 of the frame carries a base plate 20 which extends across between the side portions of the U-shaped extension 8 and has circular portions which embrace the said side portions. While this plate 20 may be slid forwardly or rearwardly relative to the U-shaped extension 8, there is enough frictional resistance to the sliding movement due to the slight natural spring of the side portions of the extension 8 to cause the base plate 20 to hold its position when once adjusted. The said base plate 20 has an upwardly extending lug 21, and a pair of angular bag embracing members 22 have inner arms which are overlapped and slotted to receive a wing nut equipped screw 23 mounted in the lug 21. The forwardly extending arms of the bag embracing members 22 are opposed and carry cooperating straps 24. Normally, the lower end of the bag B may rest on the base plate 20 with the forwardly projecting arms of the bag embracing members 22 bearing against the sides of the lower end of the bag and with the straps 24 encircling the lower end of the bag. By reason of the adjustable mounting of the two bag embracing members 22 the forwardly extending arms of the bag embracing members may be spread apart varying distances to receive bags of different widths.

The cap casting 15 has a rearwardly extending hub-like circular portion 25 having one face which is provided with a series of radially extending teeth and centrally carrying a wing nut equipped stud 26. A handle 27 carries at one end a casting 28 provided with a circular portion equipped with mating radially extending teeth and the said circular portion of the part 28 is apertured to receive the stud 26. The opposite end of the handle 27 carries a rubber hand grip 29. With the arrangement shown, by loosening the wing nut of the wing nut equipped stud 26 the handle 27 may be swung as from the dotted line downwardly extending position shown in Fig. 1 to the full line extended position, whereupon when the handle has been set at a desired angle relative to the frame A the wing nut of the stud 26 may be tightened to secure the handle in the set position. In similar manner, the handle may be swung down against the frame A.

Secured to the rear side of the lower portions of the arms 9 of the frame are a pair of yoke members 30 of substantially semi-circular formation. These yoke members have central flattened portions receiving the forked rear ends of a pair of forwardly projecting arms 31, the said arms being pivotally connected to the yokes by the pivot pins 32. These arms 31 have forward hubs carrying a cross tube 33 within which a pair of axles 34 are telescopically mounted for extension and retraction laterally in respect to the arms 9 of the frame A. Tire-equipped wheels 35 are in turn journaled on the outer end portions of the axles 34. The tube 33 has longitudinal slots 33a formed therein and the hubs of the arms 31 are provided with tapered notches 31a aligned with the said slots 33a. Knob-equipped set screws 36 are screwed into end portions of the axles 34 and project through the slots 33a and these knob-equipped set screws may be either tightened down against the tube 33 to hold the two axles 34 inwardly slid as shown in full lines Fig. 2 or when the axles are extended the knobs of the set screws 36 may be received within the notches 31a to securely hold the axles in the extended positions as shown in dotted lines Fig. 2.

Upper and lower springs 37 are interposed between the upper and lower sides of the forward ends of the arms 31 and the yokes 30, these springs being centered and held in place by cooperating pins carried by the yokes 30 and the forward portions of the arms 31.

When not in use the entire caddy cart may be stored away in small compass as within an ordinary golfer's athletic locker or elsewhere. In this condition the wheels 35 may be retracted against the sides of the arms 9 of the frame A and the handle 27 may be swung downwardly to the dotted line position shown in Fig. 1. When it is desired to use the caddy cart it may be removed from its storage place and by loosening the knob-equipped set screws 36 and drawing the two wheels 35 outwardly the axles 34 may be extended so that the spacing between the wheels 35 is such as to very stably support the caddy cart. Thereupon the knob-equipped set screws 36 may be tightened within the notches 31a to hold the wheels in the extended position. The handle 27 can then be raised from the dotted line position to the full line position shown in Fig. 1 and the angulation of the handle relative to the frame A may be adjusted to meet the requirements of the height of the individual golfer. Also, it is possible to raise or lower the upper tube 13 in the three-way fitting 11 to suit the requirements of the individual golfer. The golf bag carrying golf clubs may be supported on the base plate 20 between the opposed forwardly extending arms of the bag embracing members 22 and these members may be adjusted transversely of the device to properly take the particular golf bag being used. In similar manner the upper portion of the golf bag may be embraced by the golf bag embracing members 17 and these members may be adjusted. Of course, the straps 24 will be engaged as will the straps 19 to securely hold the golf bag B in place. Adjustment of the base plate 20 fore and aft the forward extension 8 may be made to properly locate the weight of the bag B and the clubs carried therein relative to the wheel axles 34 to best support the bag as the caddy cart is pushed or drawn over the golf course without imposing undue weight on the arm of the golfer. The caddy cart carrying the bag and clubs can be easily wheeled over the golf course from one position to another and when the golfer drops the handle 27 the weight of the golf bag and clubs will cause the parts to swing relative to the wheels 35 so that the forward extension 8 will rest on the ground. The cart will then stand in upright position without tipping over even though the ground be rather rough on which the cart stands, and the golfer can easily gain access to his clubs.

Referring to Figs. 5, 6 and 7, the caddy cart there shown is similar to the caddy cart shown in Figs. 1–4 with the exception that the spring mounting for the wheel axles is eliminated. In the case of the caddy cart shown in Figs. 5, 6 and 7, and which will be designated by the letter C, the yoke members 30 are eliminated as are the arms 31 and the springs 37, and hub carrying brackets 38 are attached to the rear portions of the upwardly extending arms of the frame. A tube 39 is mounted in the hubs of the two brackets 38 and this tube in turn carries the wheel-equipped axles 40. The tube 39 is provided with slots 39a as in the previously described construction and the hubs of the brackets 38 are provided with notches 38a as in the previously described construction, and the axles 40 carry knob-equipped set screws 41 for locking the axles in a desired extended or retracted condition.

While the construction shown in Figs. 5, 6 and 7 does not have all of the advantages of the construction shown in Figs. 1–4 inasmuch as the axles are not cushioned in the caddy cart C, the cart C is, of course, of more economical construction.

It will be seen that a highly convenient caddy cart has been provided.

It will, of course, be understood that various changes may be made in the form, details, arrangement and proportions of the various parts without departure from the scope of the present invention which, generally stated, consists in the matter shown, and described, and set forth in the appended claims.

What I claim is:

1. A caddy cart comprising an upright frame having a lower forward extension, means carried by said frame for securing a golf bag thereto for support by the frame, a handle attached to the upper part of said frame for rearward extension, a pair of tubular sockets carried by said frame in spaced relation from the lower end thereof and disposed transversely of the frame, a tube carried by said sockets, said tube having a pair of slots therein and said sockets having notches in alignment with said slots, a pair of axles slidably mounted in said tube for telescopic extension therefrom, wheels carried by the outer ends of said axles and a pair of set screws carried by inner portions of said axles received within said grooves and having portions adapted to be received within said notches to tightly engage the same whereby said wheels can be held retracted adjacent the sides of said frame and can be extended therefrom and locked in position.

2. A caddy cart comprising a frame having a U-shaped forward extension adjacent its lower end, a pair of upright members running upwardly in spaced relation from said forward extension and having upper end portions which are inclined toward each other, a three-way fitting receiving said inclined end portions, an upper frame member also received by said fitting and telescopically adjustable relative thereto to vary the height of the upper end thereof, a golf bag base support carried by said forward extension, a bag attaching device carried by said base support for receiving and holding the lower end of a golf bag, a golf bag attaching device carried by said upper frame member, and wheel carrying axles supported by said upwardly extending frame members.

ERNEST A. LOVE.

REFERENCES CITED

The following references are of record in the file of this patent:

UNITED STATES PATENTS

| Number | Name | Date |
|---|---|---|
| 2,236,053 | Caron | Mar. 25, 1941 |
| 2,405,674 | Schliwa et al. | Aug. 13, 1946 |

FOREIGN PATENTS

| Number | Country | Date |
|---|---|---|
| 243,258 | Switzerland | Dec. 16, 1946 |